(12) United States Patent
Guo et al.

(10) Patent No.: US 9,374,600 B2
(45) Date of Patent: Jun. 21, 2016

(54) METHOD AND APPARATUS OF IMPROVED INTRA LUMA PREDICTION MODE CODING UTILIZING BLOCK SIZE OF NEIGHBORING BLOCKS

(71) Applicant: MEDIATEK Singapore Pte. Ltd., Singapore (SG)

(72) Inventors: Mei Guo, San Jose, CA (US); Guo Xun, Beijing (CN); Shaw-Min Lei, Hsinchu County (TW)

(73) Assignee: MEDIATEK SINGAPORE PTE. LTD, Singapore (SG)

( * ) Notice: Subject to any disclaimer, the term of this patent is extended or adjusted under 35 U.S.C. 154(b) by 0 days.

(21) Appl. No.: 14/594,145

(22) Filed: Jan. 11, 2015

(65) Prior Publication Data

US 2015/0131722 A1 May 14, 2015

Related U.S. Application Data

(60) Division of application No. 13/198,697, filed on Aug. 4, 2011, which is a continuation-in-part of application No. PCT/CN2011/076870, filed on Jul. 5, 2011.

(60) Provisional application No. 61/430,701, filed on Jan. 7, 2011, provisional application No. 61/437,910, filed on Jan. 31, 2011.

(51) Int. Cl.
*H04N 19/159* (2014.01)
*H04N 19/11* (2014.01)
(Continued)

(52) U.S. Cl.
CPC ........... *H04N 19/593* (2014.11); *H04N 19/159* (2014.11); *H04N 19/196* (2014.11); *H04N 19/463* (2014.11); *H04N 19/11* (2014.11)

(58) Field of Classification Search
None
See application file for complete search history.

(56) References Cited

U.S. PATENT DOCUMENTS 8,526,495 B2 9/2013 Liu et al.
9,154,796 B2 * 10/2015 Seregin .................. H04N 19/11
(Continued)

FOREIGN PATENT DOCUMENTS

CN 101500161 8/2009
CN 101668202 3/2010
(Continued)

OTHER PUBLICATIONS

Lee, J., et al.; "Intra-mixture Prediction Mode and Enhanced Most Probable Mode Estimation for Intra Coding in H.264AVC;" 2009 Fifth International Joint Conference on INC, IMS, and IDC; 2009; pp. 1619-1622.

(Continued)

*Primary Examiner* — Dave Czekaj
*Assistant Examiner* — Tyler W Sullivan
(74) *Attorney, Agent, or Firm* — McClure, Qualey & Rodack, LLP

(57) ABSTRACT

A method of video coding using intra prediction in which the intra prediction modes are ranked according to a priority order associated with the block size. One or more tables are used, where the tables ranks the intra prediction modes according to a first priority order for the block having a first block size and ranks the intra prediction modes according to a second priority order for the block having a second block size. Two or more neighboring intra prediction modes corresponding to two or more neighboring blocks are received, where each neighboring block has a neighboring block size corresponding to the first block size or the second block size. A highest-priority mode among said two or more neighboring intra prediction modes is selected as the most probable mode. The current mode is then encoded or decoded using the most probable mode as a predictor.

20 Claims, 7 Drawing Sheets

(51) Int. Cl.
- *H04N 19/50* (2014.01)
- *H04N 19/593* (2014.01)
- *H04N 19/196* (2014.01)
- *H04N 19/463* (2014.01)

(56) References Cited

U.S. PATENT DOCUMENTS

| | | | | |
|---|---|---|---|---|
| 2003/0206594 A1* | 11/2003 | Zhou | H04N 19/105 | 375/240.16 |
| 2004/0028282 A1* | 2/2004 | Kato | H04N 19/176 | 382/236 |
| 2004/0234144 A1* | 11/2004 | Sugimoto | H04N 19/176 | 382/239 |
| 2006/0104354 A1 | 5/2006 | Han et al. | | |
| 2008/0013629 A1* | 1/2008 | Karczewicz | H04N 19/197 | 375/240.13 |
| 2008/0123947 A1 | 5/2008 | Moriya et al. | | |
| 2008/0175319 A1 | 7/2008 | Sun et al. | | |
| 2008/0267287 A1 | 10/2008 | Hannuksela | | |
| 2009/0034632 A1* | 2/2009 | Chono | H04N 19/176 | 375/240.27 |
| 2009/0175334 A1 | 7/2009 | Ye et al. | | |
| 2011/0038414 A1* | 2/2011 | Song | H04N 19/105 | 375/240.12 |
| 2011/0047155 A1* | 2/2011 | Sohn | G10L 19/022 | 707/736 |
| 2011/0243227 A1 | 10/2011 | Yoneji et al. | | |
| 2011/0286520 A1* | 11/2011 | Xu | H04N 19/176 | 375/240.12 |
| 2011/0292994 A1* | 12/2011 | Lim | H04N 19/182 | 375/240.02 |
| 2012/0082222 A1* | 4/2012 | Wang | H04N 19/176 | 375/240.12 |
| 2012/0082223 A1 | 4/2012 | Karczewicz et al. | | |
| 2012/0177118 A1 | 7/2012 | Karczewicz et al. | | |
| 2013/0034157 A1* | 2/2013 | Helle | H04N 19/52 | 375/240.12 |
| 2015/0163512 A1* | 6/2015 | Cai | H04N 19/593 | 375/240.12 |

FOREIGN PATENT DOCUMENTS

| | | |
|---|---|---|
| KR | 20060045314 | 5/2006 |
| WO | WO 2009128653 A2 * | 10/2009 |
| WO | WO 2010/067529 | 6/2010 |

OTHER PUBLICATIONS

Ur-Rehman, J., et al.; "Fast Intra Prediction Mode Decision by Adaptively Selecting Fewer Number of Modes;" Proceedings of the Sixth International Conference on Machine Learning and Cybernetics; Aug. 2007; pp. 2385-2389.

"The H.264 Advanced Video Compression Standard;" 2010; pp. 137-177.

Wiegand, T., et al.; "WD1 Working Draft 1 of High-Efficiency Coding;" Joint Collaborative Team on Video Coding (JCT-VC) of ITU-T SG16 WP3 and ISO/IEC JTC1/SC29/WG11; Oct. 2010; pp. 1-137.

Guo, M., et al.; "Improved Intra Mode Coding;" Joint Collaborative Team on Video Coding (JCT-VC) of ITU-T SG16 VP3 and ISO/IEC JTC1/SC29/WG11; Jan. 2011; pp. 1-7.

* cited by examiner

```
MostProbableModeFlag;
if (MostProbableModeFlag) {
   MostProbableModeIndex;
} else {
   RemPredMode;
}
```

*Fig. 5A*

```
IntraPredMode; //combined syntax
if ( IntraPredMode == MPM_CODEWORD ) {
  MostProbableModeIndex; //could be any codewords
}
```

*Fig. 5B*

```
IntraPredMode;
 if (IntraPredMode == CODEWORD_A) {
   ModeC = ModeA;
 } else if (IntraPredMode == CODEWORD_B) {
   ModeC = ModeB;
 } else { // IntraPredMode == CODEWORD_X
   ModeC = ModeX;
```

*Fig. 5C*

METHOD AND APPARATUS OF IMPROVED INTRA LUMA PREDICTION MODE CODING UTILIZING BLOCK SIZE OF NEIGHBORING BLOCKS

CROSS REFERENCE TO RELATED APPLICATIONS

The present application is a divisional of U.S. Non-provisional patent application Ser. No. 13/198,697, filed on Aug. 4, 2011, which claims priority to U.S. Provisional Patent Application Ser. No. 61/430,701, filed on Jan. 7, 2011, entitled "Improved Intra Prediction Mode Coding Method", U.S. Provisional Patent Application Ser. No. 61/437,910, filed on Jan. 31, 2011, entitled "Improved Intra Prediction Mode Coding Method", and PCT Patent Application, Serial No. PCT/CN2011/076870, filed on Jul. 5, 2011, entitled "Method and Apparatus of Improved Intra Luma Prediction Mode Coding". The U.S. Non-provisional Patent Application and U.S. Provisional Patent Applications and the PCT Patent Application are hereby incorporated by reference in their entireties.

FIELD OF THE INVENTION

The present invention relates to video coding. In particular, the present invention relates to coding techniques associated with the intra luma prediction mode.

BACKGROUND

Motion compensated inter-frame coding has been widely adopted in various coding standards, such as MPEG-1/2/4 and H.261/H.263/H.264/AVC. While motion-compensated inter-frame coding can effectively reduce bitrate for compressed video, intra mode coding is still required to process an initial picture or to periodically insert I-pictures (or Intra-coded picture, I-picture), and the I-pictures are inserted periodically to allow quick access to the compressed video data or to alleviate error propagation. Intra prediction exploits the spatial correlation within a picture or within a picture region. In order to further improve coding efficiency, the High-Efficiency Video Coding (HEVC) standard being developed exploits block-based spatial prediction extensively. In HEVC, multiple intra prediction modes are used to exploit spatial features and the number of intra prediction modes depends on the block size of a Prediction Unit (PU). For some PU block sizes (currently larger than 4×4), the number of intra luma prediction modes may be as many as 34. The intra luma prediction mode selected for each block has to be transmitted to the decoder side for proper decoding. The side information associated with the intra luma prediction mode may be substantial and therefore, it is desirable to develop schemes to improve the efficiency for coding intra luma prediction mode.

The intra luma prediction modes among neighboring blocks may be highly correlated. Therefore, the intra luma prediction modes from neighboring blocks that have been reconstructed may be used as a predictor for a current block. In HEVC, a coding scheme for the intra luma prediction mode is being considered, where the intra prediction mode of a current block is compared with the minimum of two intra luma prediction modes corresponding to two neighboring blocks. If the intra prediction mode of the current block is the same as the minimum of the two neighboring intra luma prediction modes, a single bit is transmitted to indicate the case. Otherwise, a single bit is transmitted along with information for the current intra prediction mode represented in fixed-length format. While the coding scheme for the intra luma prediction mode being considered may not fully exploit the correlations of the neighboring intra luma prediction modes, it is desirable to further improve the performance. Accordingly, a coding scheme that further exploits the dependency of the neighboring intra luma prediction mode is disclosed.

BRIEF SUMMARY OF THE INVENTION

A method of video coding using intra prediction for a block of video data is disclosed. In one embodiment according to the present invention, the intra prediction modes are ranked according to a priority order associated with the block size. One or more tables are used, where the tables ranks the intra prediction modes according to a first priority order for the block having a first block size and ranks the intra prediction modes according to a second priority order for the block having a second block size. Two or more neighboring intra prediction modes corresponding to two or more neighboring blocks are received, where each neighboring block has a neighboring block size corresponding to the first block size or the second block size. A highest-priority mode among said two or more neighboring intra prediction modes is selected as the most probable mode. The current mode is then encoded or decoded using the most probable mode as a predictor. The block may correspond to prediction unit (PU).

The neighboring blocks may correspond to an above block located above the current block and a left block located at a left side of the current block. The first block may correspond to a 4×4 or 8×8 block. In this case, Vertical intra prediction mode with mode index 0 has a highest priority in said one or more tables. The second block may correspond to a 16×16, 32×32 or 64×64 block. In this case, DC intra prediction mode with mode index 2 has a highest priority in said one or more tables. Planner intra prediction mode may have different priorities for different block sizes in the group consisting of a 16×16, 32×32 and 64×64 blocks.

BRIEF DESCRIPTION OF THE DRAWINGS

FIGS. 5A-C illustrate examples of syntax design to support intra prediction mode coding with two intra prediction mode candidates according to the present invention.

DETAILED DESCRIPTION OF THE INVENTION

Figure 1:
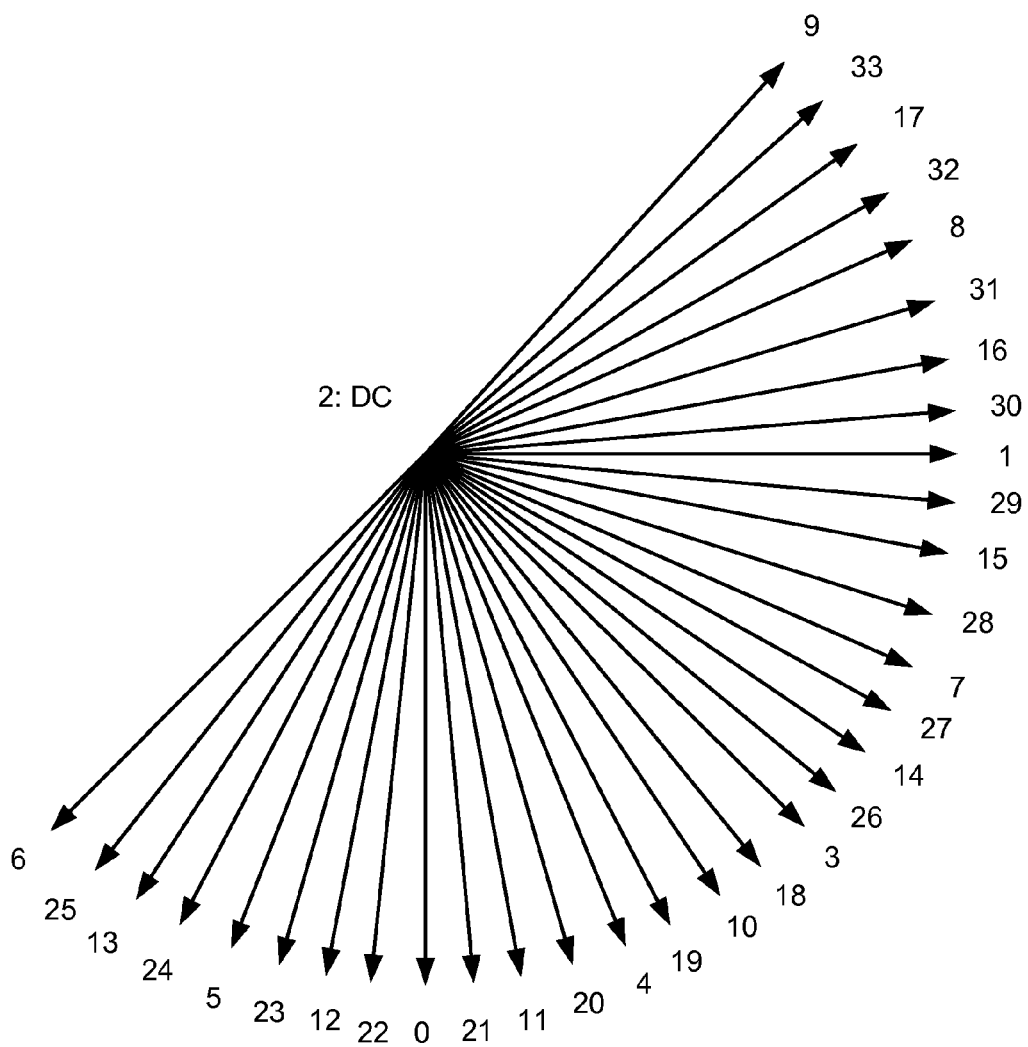
FIG. 1 illustrates the 34 intra luma prediction modes including various angular modes and a DC mode being considered for High-Efficiency Video Coding (HEVC).

Motion compensated inter-frame coding has been widely adopted in various coding standards, such as MPEG-1/2/4 and H.261/H.263/H.264/AVC. While motion-compensated inter-frame coding can effectively reduce bitrate for compressed video, intra coding is still required to process an intra picture (or I-picture), or intra blocks (or I-blocks) for quick access to the compressed video data or to alleviate error propagation. Intra prediction exploits the spatial correlation within a picture or within a picture region. In order to further improve coding efficiency, the High-Efficiency Video Coding (HEVC) standard being developed exploits block-based spatial prediction extensively. In HEVC, more intra prediction modes are used to exploit spatial features and the number of intra prediction modes depends on the block size of a Prediction Unit (PU). For example, HEVC being developed allows intra prediction of luma block (i.e., PU) at sizes of 64×64, 32×32, 16×16, 8×8, and 4×4. For each block size, multiple intra prediction modes are used as shown in Table 1. For block sizes 32×32, 16×16, and 8×8, there are 34 modes including 33 directional prediction modes and a DC mode as shown in FIG. 1. For block sizes 64×64 and 4×4, subsets of the 34 prediction modes are used. The set of available intra prediction modes for a given block size is called a prediction mode set in this disclosure. Accordingly, the prediction mode set for block sizes 32×32, 16×16, and 8×8 contains 34 intra prediction modes and the prediction mode set for block sizes 64×64 and 4×4 contains 3 and 17 intra prediction modes respectively.

TABLE 1

| Block size | Number of Luma Mode | Luma Modes |
| --- | --- | --- |
| 64 × 64 | 3 | 0~2 |
| 32 × 32 | 34 | 0~33 |
| 16 × 16 | 34 | 0~33 |
| 8 × 8 | 34 | 0~33 |
| 4 × 4 | 17 | 0~16 |

Figure 2:
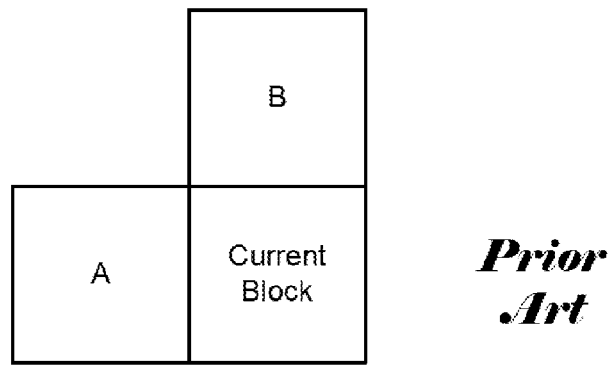
FIG. 2 illustrates an example of two neighboring blocks.
Figure 3:
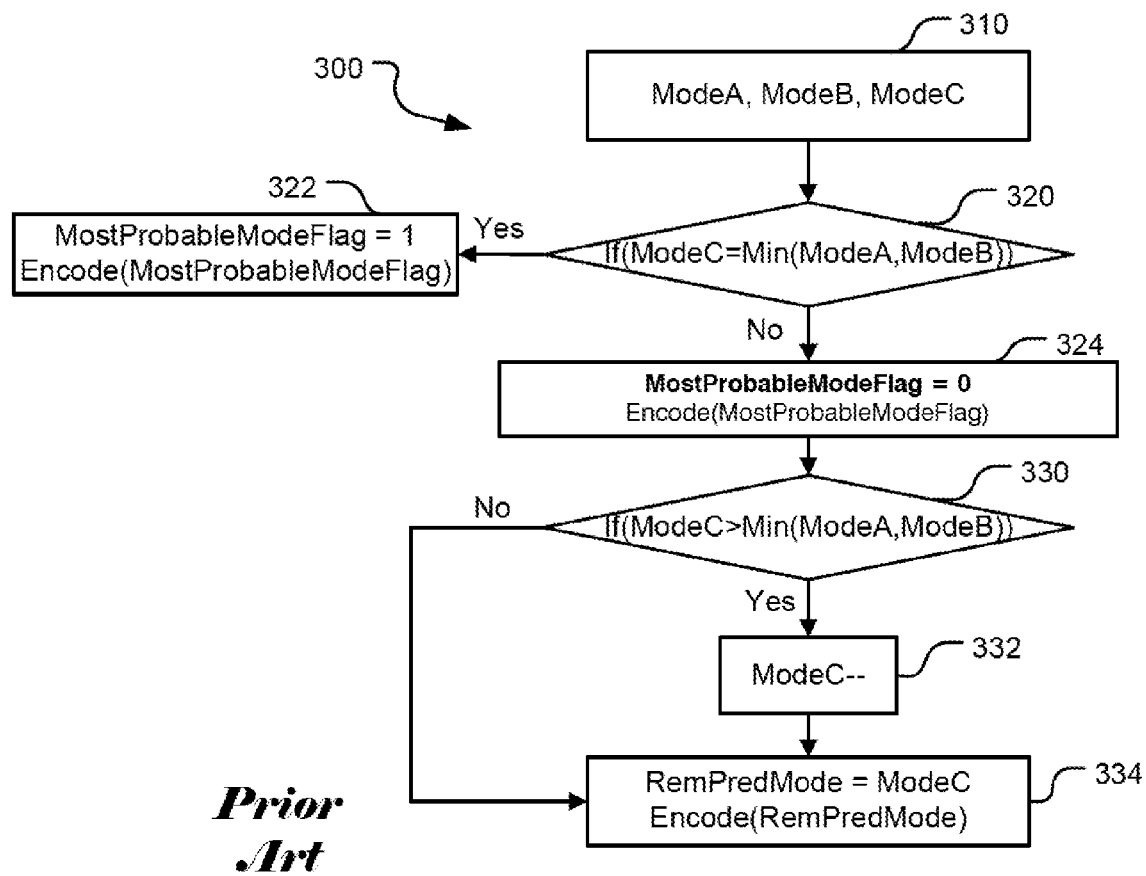
FIG. 3 illustrates a flow chart corresponding to coding the intra prediction mode according to a conventional approach.

The use of multiple intra prediction modes can improve quality of prediction by resulting in smaller intra prediction residues. However, the intra luma prediction mode selected for each block has to be transmitted to the decoder side for proper decoding. The side information associated with the intra luma prediction mode may be substantial. In HEVC, a coding scheme for the intra luma prediction mode is being considered, where the intra prediction mode of a current block is compared with the minimum of two neighboring intra luma prediction modes. The configuration of the two neighboring blocks is showing in FIG. 2, where block A is on the left side and block B is on the top side of the current block. ModeA and ModeB designate the intra luma prediction modes for block A and block B respectively. A flow chart 300 corresponding to the conventional scheme considered for HEVC is shown in FIG. 3. The intra prediction mode of the current block ModeC and two neighboring intra prediction modes ModeA and ModeB are received at step 310. According to the conventional scheme considered for HEVC, the intra mode predictor PredMode is first calculated based on predMode=Min(ModeA, ModeB) and PredMode is compared with ModeC in step 320. If the intra prediction mode of the current block ModeC is the same as the predMode (i.e., the "Yes" arrow), a 1-bit flag MostProbableModeFlag=1 is transmitted to indicate the case as shown in step 322. Otherwise (i.e., the "No" arrow), a 1-bit flag MostProbableModeFlag=0 is transmitted to indicate the case as shown in step 324 and the remainder mode RemPredMode for the current intra prediction mode ModeC is transmitted, where RemPredMode is the same as ModeC if ModeC<PredMode and, otherwise RemPredMode=ModeC−1. Accordingly, the test "If (ModeC>Min(ModeA, ModeB))" is performed in step 330. If the result is "Yes", ModeC is decremented by 1 as shown in step 332. Otherwise (i.e., the "No" arrow), RemPredMode=ModeC and the flow goes to step 334. The ModeC is then transmitted in step 334. For convenience, the case that ModeC is the same as the PredMode is called "predictor hit" and the case that ModeC is not the same as the PredMode is called "predictor miss" in this disclosure. RemPredMode is represented in fixed-length codewords. The neighboring intra luma prediction modes ModeA and ModeB may be invalid when the current block is at the left boundary or top boundary of the picture, or the neighboring blocks and the current block have different block sizes. For example, when the current block size is 4×4 or 64×64 and neighboring blocks have other sizes, ModeA and ModeB may be invalid for the current block. In this case, ModeA and ModeB will be mapped into valid modes first and then predMode is derived as the minimum of ModeA and ModeB.

Figure 4:
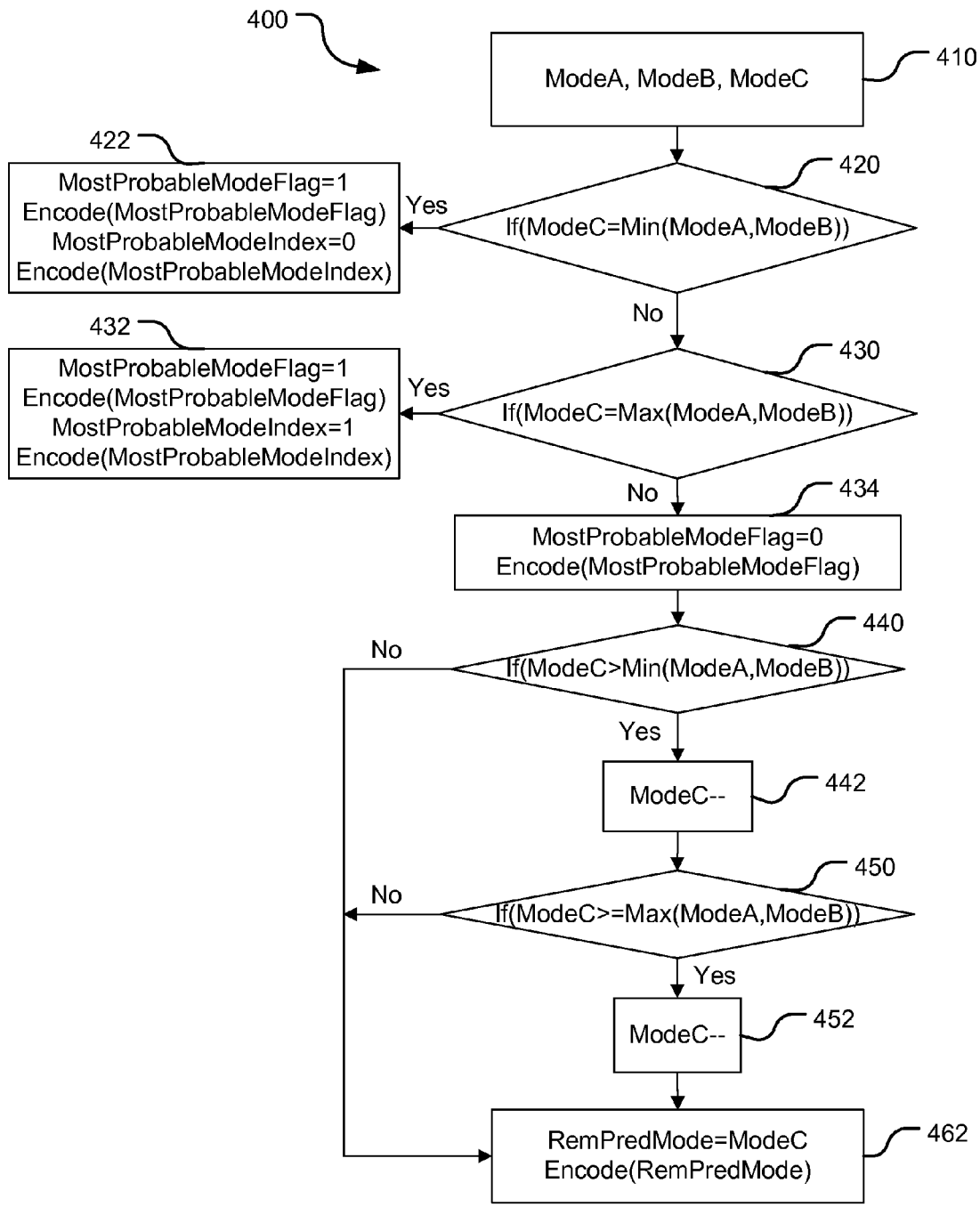
FIG. 4 illustrates an exemplary flow chart corresponding to coding intra prediction mode with two intra prediction mode candidates according to the present invention.

In the above predictive coding for intra luma prediction mode, the intra mode predictor PredMode is derived to provide a single candidate, i.e., Min(ModeA, ModeB). When the current intra prediction mode ModeC is equal to PredMode, only 1 bit, i.e., MostProbableModeFlag=1 is required to indicate this case. When the current intra prediction mode ModeC is not equal to PredMode, MostProbableModeFlag=0 and RemPredMode have to be transmitted, which will require more bits. Consequently, the cost in terms of side information is much higher for the case of predictor miss than that for the case of predictor hit. Therefore, an embodiment according to the present invention extends the intra mode predictor PredMode to include more than one candidate in order to improve the probability of ModeC being equal to PredMode, i.e., to improve the chance for predictor hit. Instead of providing a single intra prediction mode candidate as described in the conventional HEVC scheme, the present invention provides multiple intra prediction mode candidates based on neighboring intra prediction modes so that there is a better chance for predictor hit. When one of the neighboring mode candidates is not available, the mode candidate can be set to DC or one of other modes to improve the probability of providing a matched predictor. When one of the neighboring modes is not a candidate intra prediction mode of ModeC (e.g., a neighboring PU and the current PU have different PU sizes and different numbers of luma modes, as illustrated in Table 1), it is first mapped to a candidate intra prediction mode of ModeC. After these processes, if ModeA is equal to ModeB, the conventional scheme is used; otherwise, multiple intra prediction mode candidates based on neighboring intra prediction modes can be introduced to the intra mode coding of the current mode. An example to derive two intra prediction mode candidates based on two neighboring intra prediction modes is illustrated in the exemplary flow chart 400 as shown in FIG. 4. While the conventional scheme only uses Min (ModeA, ModeB) as the intra prediction mode candidate, the example in FIG. 4 also uses Max(ModeA, ModeB) as a second intra prediction mode candidate. The process starts with receiving ModeA, ModeB and ModeC in step 410. The test "If (ModeC=Min(ModeA, ModeB))" is performed in step 420. If the result is "Yes", coded representation, i.e., a codeword "1" and a codeword "0" are transmitted, as shown in step 422, to indicate the case. The codeword "1" corresponds to MostProbableModeFlag=1 and the codeword "0" indicates the selection of minimum of ModeA and ModeB. The selection bit is referred as MostProbableModeIndex in this disclosure. Otherwise (i.e., the "No" arrow from step 420), the test "If (ModeC=Max(ModeA, ModeB))" is performed in step 430. If the result is "Yes", coded representation, i.e., a codeword "1" and a second codeword "1" are transmitted, as shown in step 432, to indicate the case. The first codeword "1" corresponds to MostProbableModeFlag=1 and the second codeword "1" indicates the selection of maximum of ModeA and ModeB. Otherwise (i.e., the "No" arrow), a codeword "0" is transmitted as shown in step 434 followed by transmitting information associated with ModeC. Similar to step 324 in FIG. 3, step 434 corresponds to the case of "MostProbableModeFlag=0". Also, similar to the conventional case, ModeC is decremented by 1 (step 442) if the test "If (ModeC>Min (ModeA,ModeB))" (step 440) is "Yes". Otherwise (i.e., the "No" arrow from step 440), ModeC is not decremented and RemPredMode is set to ModeC as shown in step 462. RemPredMode is then transmitted. In the example of FIG. 4, an additional test "If (ModeC>=Max(ModeA,ModeB))" (step 450) is performed after step 442. If the result is "Yes", ModeC is decremented by 1 (step 452). Otherwise (i.e., the "No" arrow from step 450), ModeC is not decremented and RemPredMode is set to ModeC as shown in step 462. It is noted that ModeC can be compared to the Max(ModeA, ModeB) first and then the Min (ModeA,ModeB). If the test "If (ModeC>Max(ModeA,ModeB))" is "Yes", ModeC is decremented by 1. No matter whether the test "If (ModeC>Max (ModeA,ModeB))" is "Yes" or "NO", the test "If (ModeC>=Min (ModeA,ModeB))" is performed. If the test "If (ModeC>=Min (ModeA,ModeB))" is "Yes", ModeC is decremented by 1 another time. Finally, ModeC is transmitted as shown in step 462.

The flow chart of FIG. 4 illustrates one embodiment to provide more than one intra luma prediction mode candidates. A skilled person in the field may practice the present invention using various variations without departing from the spirit or essential characteristics of the present invention. For example, neighboring blocks from other spatial locations, more than two neighboring blocks, more than two intra luma prediction mode candidates, or other methods to derive the candidates can be used to practice the invention. The syntax to support the provisioning of multiple candidates may be designed in various formats. For example, FIG. 5A illustrates a syntax example similar to the conventional method where MostProbableModeFlag and RemPredMode are used. However, an additional bit, MostProbableModeIndex, is transmitted to indicate whether ModeA or ModeB is used. FIG. 5B illustrates another syntax design where combined syntax IntraPredMode is used. The codeword of IntraPredMode is selected depending on ModeC, ModeA and ModeB. A specific codeword MPM_CODEWORD is associated with the case that ModeC is equal to one of ModeA and ModeB. If IntraPredMode is the same as the codeword MPM_CODEWORD, MostProbableModeIndex is transmitted to indicate whether ModeA or ModeB is used. When IntraPredMode is not the same as the codeword MPM_CODEWORD which means the current prediction mode is not equal to either ModeA or ModeB, the codewords of IntraPredMode convey the information of the current intra luma prediction mode. FIG. 5C illustrates yet another syntax design. If IntraPredMode is the same as the codeword of ModeA, then ModeA is used as the mode for the current block. Otherwise, if IntraPredMode is the same as the codeword of ModeB, then ModeB is used as the mode for the current block. If neither case is satisfied, the information for the current mode is transmitted. The following tables (Tables 2 through 4) show the corresponding examples of the syntax definitions in PU level described by pseudo C language.

TABLE 2

Exemplary syntax definition for FIG. 5A

| prediction_unit( x0, y0, log2PUWidth, log2PUHeight, PartIdx, InferredMergeFlag ) { | Descriptor |
|---|---|
| if( skip_flag[ x0 ][ y0 ] ) { | |
| ... | |
| } else if( PredMode = = MODE_INTRA ) { | |
| prev_intra_luma_pred_flag[ x0 ][ y0 ] | u(1)\|ae(v) |
| if( !prev_intra_luma_pred_flag[ x0 ][ y0 ] ) | |
| If(NumMPMCand>1) | |
| mpm_idx[ x0 ][ y0 ] | u(1)\|ae(v) |
| else | |
| rem_intra_luma_pred_mode[ x0 ][ y0 ] | ue(v)\|ae(v) |
| ... | |
| } | |
| ... | |

TABLE 3

Exemplary syntax definition for FIG. 5B

| prediction_unit( x0, y0, log2PUWidth, log2PUHeight, PartIdx, InferredMergeFlag ) { | Descriptor |
|---|---|
| if( skip_flag[ x0 ][ y0 ] ) { | |
| ... | |
| } else if( PredMode = = MODE_INTRA ) { | |
| intra_luma_pred_flag[ x0 ][ y0 ] | ue(v)\|ae(v) |
| if( intra_luma_pred_flag[ x0 ][ y0 ] == MPM_CODEWORD) | |
| If(NumMPMCand>1) | |
| mpm_idx[ x0 ][ y0 ] | u(1)\|ae(v) |
| ... | |
| } | |
| ... | |

TABLE 4

Exemplary syntax definition for FIG. 5C

| prediction_unit( x0, y0, log2PUWidth, log2PUHeight, PartIdx, InferredMergeFlag ) { | Descriptor |
|---|---|
| if( skip_flag[ x0 ][ y0 ] ) { | |
| ... | |
| } else if( PredMode = = MODE_INTRA ) { | |
| intra_luma_pred_flag[ x0 ][ y0 ] | ue(v)\|ae(v) |
| ... | |
| } | |
| ... | |

In current HEVC, only one coding table is used for representing information associated with RemPredMode. An embodiment according to the present invention may use a single coding table or multiple coding tables to represent information associated with RemPredMode or IntraPredMode. In the case of multiple coding tables, the table selection can be based on the modes of neighboring blocks to avoid the need of side information. For example, in case of two coding tables used, the first table may be chosen if the neighboring modes are the same and the second table is chosen otherwise, as shown in examples of Table 5 and Table 6. Table 5 lists the codewords (as well as "depth", namely the length of each codeword) with 17 candidate intra modes for a specific PU size (e.g., 4×4), while Table 6 lists the codewords (as well as "depth", namely the length of each codeword) with 34 candidate intra modes for a specific PU size (e.g., 8×8, 16×16 and 32×32). In both Table 5 and Table 6, CodingTableOne is used when two neighboring modes are the same while CodingTableTwo is used when two neighboring modes are different. If ModeC is equal to either ModeA or ModeB, MPM_CODEWORD is transmitted followed by MostProbableModeIndex; otherwise, the codeword is selected according to the RemPredMode. Furthermore, the coding tables may also be selected according to different block (i.e., PU) sizes.

TABLE 5

Exemplary multiple tables with 17 candidate intra modes

|  |  | CodingTableOne | | CodingTableTwo | |
|---|---|---|---|---|---|
|  |  | Codeword | Depth | Codeword | Depth |
| MPM_CODEWORD |  | 1 | 1 | 1 | 1 |
| RemPredMode | 0 | 7 | 4 | 0 | 4 |
|  | 1 | 6 | 4 | 15 | 5 |
|  | 2 | 11 | 5 | 14 | 5 |
|  | 3 | 10 | 5 | 13 | 5 |
|  | 4 | 9 | 5 | 12 | 5 |
|  | 5 | 8 | 5 | 11 | 5 |
|  | 6 | 7 | 5 | 10 | 5 |
|  | 7 | 6 | 5 | 9 | 5 |
|  | 8 | 5 | 5 | 8 | 5 |
|  | 9 | 4 | 5 | 7 | 5 |
|  | 10 | 3 | 5 | 6 | 5 |
|  | 11 | 2 | 5 | 5 | 5 |
|  | 12 | 3 | 6 | 4 | 5 |
|  | 13 | 2 | 6 | 3 | 5 |
|  | 14 | 1 | 6 | 2 | 5 |
|  | 15 | 0 | 6 | Null | Null |

TABLE 6

Exemplary multiple tables with 34 candidate intra modes

|  |  | CodingTableOne | | CodingTableTwo | |
|---|---|---|---|---|---|
|  |  | Codeword | Depth | Codeword | Depth |
| MPM_CODEWORD |  | 1 | 1 | 1 | 1 |
| RemPredMode | 0 | 0 | 4 | 0 | 4 |
|  | 1 | 7 | 5 | 5 | 5 |
|  | 2 | 6 | 5 | 4 | 5 |
|  | 3 | 5 | 5 | 3 | 5 |
|  | 4 | 4 | 5 | 2 | 5 |
|  | 5 | 3 | 5 | 24 | 6 |
|  | 6 | 2 | 5 | 23 | 6 |
|  | 7 | 23 | 6 | 22 | 6 |
|  | 8 | 22 | 6 | 21 | 6 |
|  | 9 | 21 | 6 | 20 | 6 |
|  | 10 | 20 | 6 | 19 | 6 |
|  | 11 | 19 | 6 | 18 | 6 |
|  | 12 | 18 | 6 | 17 | 6 |
|  | 13 | 17 | 6 | 16 | 6 |
|  | 14 | 16 | 6 | 15 | 6 |
|  | 15 | 61 | 7 | 14 | 6 |
|  | 16 | 60 | 7 | 13 | 6 |
|  | 17 | 59 | 7 | 12 | 6 |
|  | 18 | 58 | 7 | 63 | 7 |
|  | 19 | 57 | 7 | 62 | 7 |
|  | 20 | 56 | 7 | 61 | 7 |
|  | 21 | 55 | 7 | 60 | 7 |
|  | 22 | 54 | 7 | 59 | 7 |
|  | 23 | 53 | 7 | 58 | 7 |
|  | 24 | 52 | 7 | 57 | 7 |
|  | 25 | 51 | 7 | 56 | 7 |
|  | 26 | 50 | 7 | 55 | 7 |
|  | 27 | 49 | 7 | 54 | 7 |
|  | 28 | 48 | 7 | 53 | 7 |
|  | 29 | 127 | 8 | 52 | 7 |
|  | 30 | 126 | 8 | 51 | 7 |
|  | 31 | 125 | 8 | 50 | 7 |
|  | 32 | 124 | 8 | Null | Null |

The plane or planar intra prediction mode has been used in H.264/AVC. However, this mode is not used in HEVC being considered. In order to improve the predictor performance, the plane or planar mode can also be included as a mode candidate in the prediction mode set. In the conventional HEVC system, a subset of intra luma prediction modes for block sizes 64×64 and 4×4 are derived from the 34 intra luma prediction modes for other block sizes. For example, currently there are 3 intra luma prediction modes corresponding to Vertical mode, Horizontal mode and DC mode are used for block size 64×64. Nevertheless, 3 different modes may be selected for 64×64 blocks and 17 different modes may be selected for 4×4 blocks.

The method of intra luma prediction mode coding for different block size can be different. One example of using a different coding method is to reorder the priority of possible modes. In a conventional scheme, the priority of prediction modes is always arranged according to the mode index. A smaller mode index always receives higher priority. The minimum of two neighboring luma prediction modes ModeA and ModeB is used as predMode. However, an embodiment according to the present invention allows re-ordering of the mode indices to improve performance. An example of mode index re-ordering is shown in Table 7, where 0 represents the highest priority. As shown in Table 7, for block sizes 16×16, 32×32 and 64×64, intra prediction mode 2 (i.e., DC mode) is assigned the highest priority while for block sizes 4×4 and 8×8, intra prediction mode 0 (i.e., Vertical mode) is assigned the highest priority. Also, intra prediction mode 34 (i.e., Plane or Planar mode) are assigned different priority in different block sizes as shown in Table 7. When the prediction mode for a PU with block size N×N is coded, predMode can be chosen to be ModeA or ModeB depending on which one possesses a higher priority. PredMode can be derived based on more neighboring blocks beyond the two neighboring blocks block A and block B.

TABLE 7

| Priority | 4 × 4 | 8 × 8 | 16 × 16 | 32 × 32 | 64 × 64 |
|---|---|---|---|---|---|
| 0 | 0 | 0 | 2(DC) | 2(DC) | 2(DC) |
| 1 | 1 | 1 | 0 | 34(Plane) | 34(Plane) |
| 2 | 2(DC) | 2(DC) | 1 | 0 | 0 |
| 3 | 3 | 34(Plane) | 34(Plane) | 1 | 1 |
| 4 | 4 | 3 | 3 | 3 | 9 |
| 5 | 5 | 4 | 4 | 4 | 3 |
| 6 | 6 | 5 | 5 | 5 | 4 |
| 7 | 7 | 6 | 6 | 6 | 5 |
| 8 | 8 | 7 | 7 | 7 | 6 |
| 9 | 9 | 8 | 8 | 8 | 7 |
| 10 | 34(Plane) | 9 | 9 | 9 | 8 |
| 11 | 10 | 10 | 10 | 10 | 10 |
| 12 | 11 | 11 | 11 | 11 | 11 |
| ... | ... | ... | ... | ... | ... |
| 33 | 32 | 32 | 32 | 32 | 32 |
| 34 | 33 | 33 | 33 | 33 | 33 |

The method of improved multiple intra prediction mode coding along with the syntax disclosed herein enables a decoder embodying the present invention to properly recover the current intra prediction mode from received bitstream corresponding to the compressed video. Since the derivation of mode predictor is based on neighboring blocks that have been processed and reconstructed, the decoder can derive the mode predictor accordingly. When one of the neighboring mode candidates is not available, the mode candidate can be set to DC or one of other modes to improve the probability of providing a matched predictor. When one of the neighboring modes is not a candidate intra prediction mode of ModeC (e.g., a neighboring PU and the current PU have different PU sizes and/or different numbers of luma modes, as illustrated in Table 1), it is first mapped to a candidate intra prediction mode of ModeC. After these processes, if ModeA is equal to ModeB, the conventional scheme is used; otherwise, the current intra mode is derived from multiple prediction mode candidates based on neighboring blocks. The bitstream contains information to indicate whether the current intra prediction mode is equal to any of the prediction mode candidates. If the information indicates that the current intra prediction mode is equal to one of the prediction mode candidates, the bitstream contains further information to indicate which of the prediction mode candidates is equal to the current prediction mode. In case that the information indicates that the current intra prediction mode is not equal to any of the prediction mode candidates, the bitstream will contain coded presentation for the current intra prediction mode for recovering the current intra prediction mode based on a coding table. Accordingly, the current intra prediction mode can be recovered at the decoder side properly.

Figure 6:
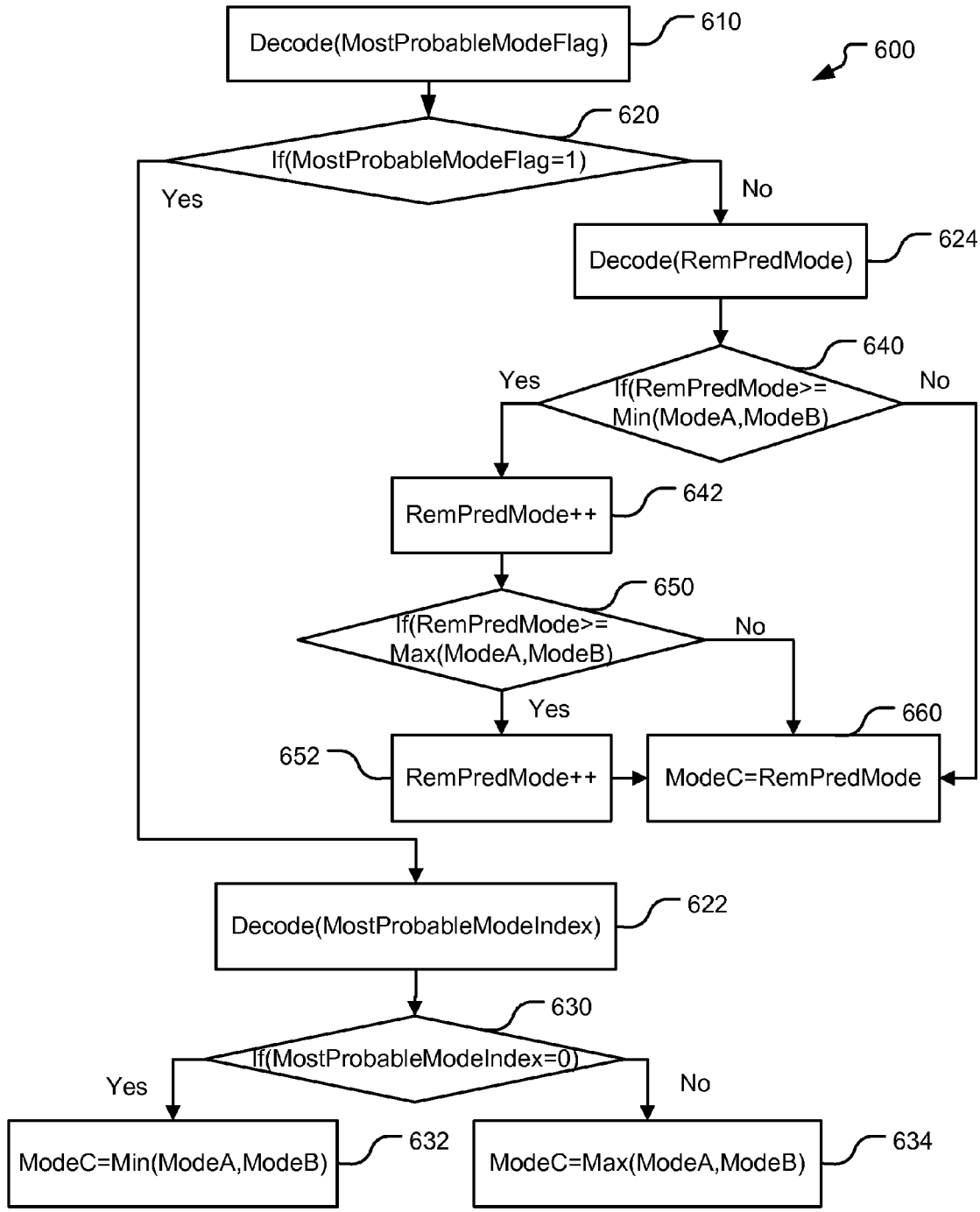
FIG. 6 illustrates an exemplary flow chart of decoding process according to one embodiment of the present invention.

An exemplary flow chart 600 for decoding process is illustrated in FIG. 6. The process starts with a decoded MostProbableModeFlag as shown in step 610. The test "If(MostProbableModeFlag=1)" is performed in step 620. If the result is "Yes", which means the current intra mode is equal to one of mode predictors based on neighboring blocks, the syntax element, MostProbableModeIndex, is decoded in step 622. Upon the decoding of MostProbableModeIndex in step 622, "If(MostProbableModeIndex=0)" is tested in step 630. If the result is "Yes", the current intra prediction mode is set according to ModeC=Min(ModeA,ModeB) as shown in step 632; otherwise (i.e., the "No" arrow from step 630), the current intra prediction mode is set according to ModeC=Max(ModeA,ModeB) as shown in step 634. However, if the result of test "If(MostProbableModeFlag=1)" in step 620 is "No", RemPredMode is decoded in step 624. And then, if the test "If(RemPredMode>=Min(ModeA,ModeB)" in step 640 is "Yes", RemPredMode is increased by 1 as shown in step 642. An additional test in step 650 "If(RemPredMode>=Max(ModeA,ModeB)" is performed. If the result of test in step 650 is "Yes", RemPredMode is increased by 1 as shown in step 652 and the flow goes to step 660. Finally, ModeC is equal to RemPredMode as shown in step 660. Either the result of test 640 or 650 is "No", ModeC is set to be equal to RemPredmode as shown in step 660.

Figure 7:
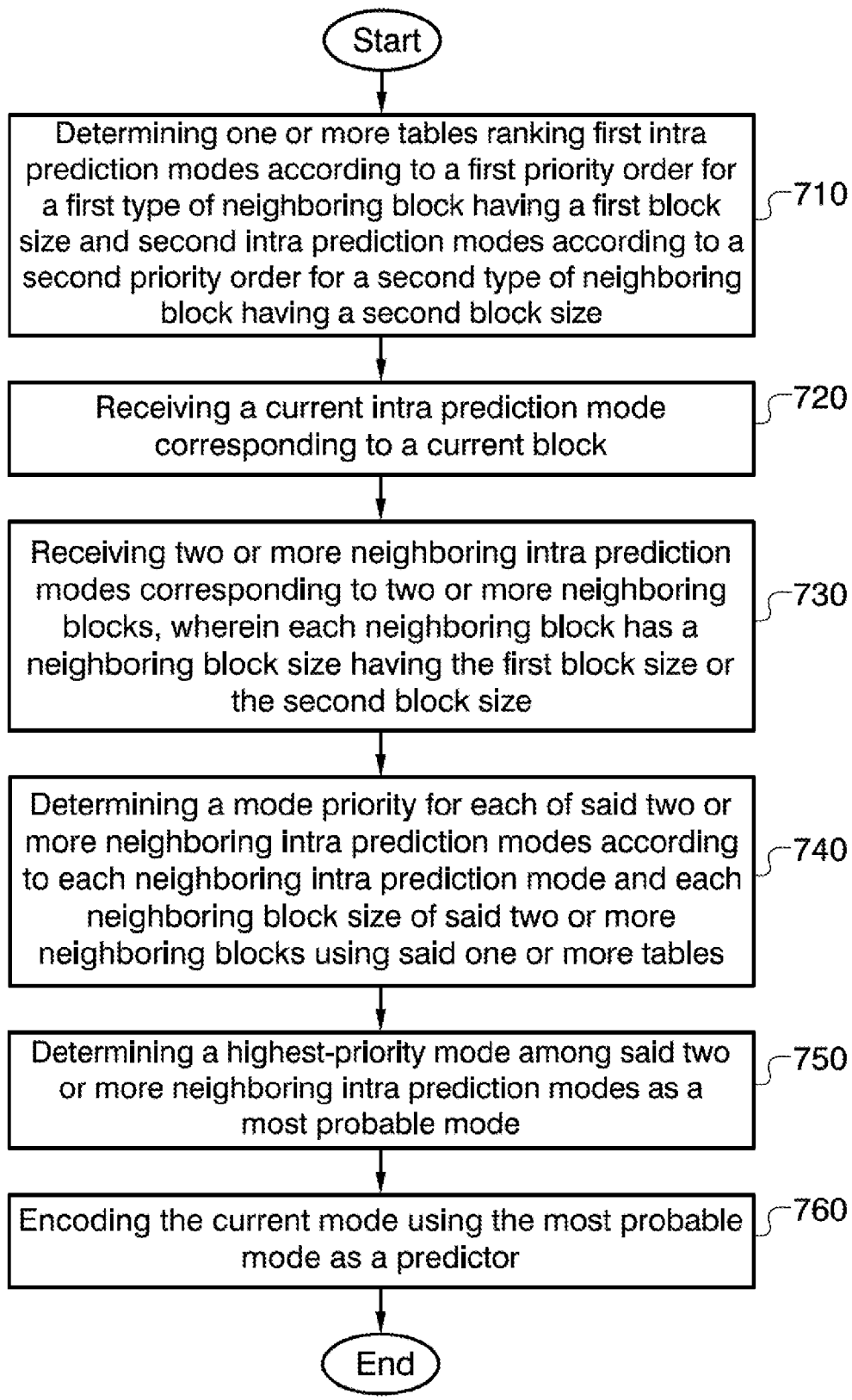
FIG. 7 illustrates an exemplary flow chart for an encoder that incorporates intra prediction with one or more tables to rank intra prediction modes depending on block sizes according to an embodiment of the present invention.

FIG. 7 illustrates an exemplary flow chart for an encoder that incorporates intra prediction with one or more tables to rank intra prediction modes depending on block sizes according to an embodiment of the present invention. One or more tables are determined in step 710, where the tables rank first intra prediction modes according to a first priority order for the block having a first block size and ranks second intra prediction modes according to a second priority order for the block having a second block size. A current intra prediction mode corresponding to a current block is received as shown in step 720. The current intra prediction mode may be retrieved from memory (e.g., computer memory, buffer (RAM or DRAM) or other media) or from a processor. Two or more neighboring intra prediction modes corresponding to two or more neighboring blocks are received in step 730, where each neighboring block has a neighboring block size corresponding to the first block size or the second block size. A mode priority for each of said two or more neighboring intra prediction modes is determined according to each neighboring intra prediction mode and each neighboring block size of said two or more neighboring blocks using said one or more tables as shown in step 740. A highest-priority mode is determined among said two or more neighboring intra prediction modes as a most probable mode in step 750. The current mode is then encoded using the most probable mode as a predictor as shown in step 760.

Figure 8:
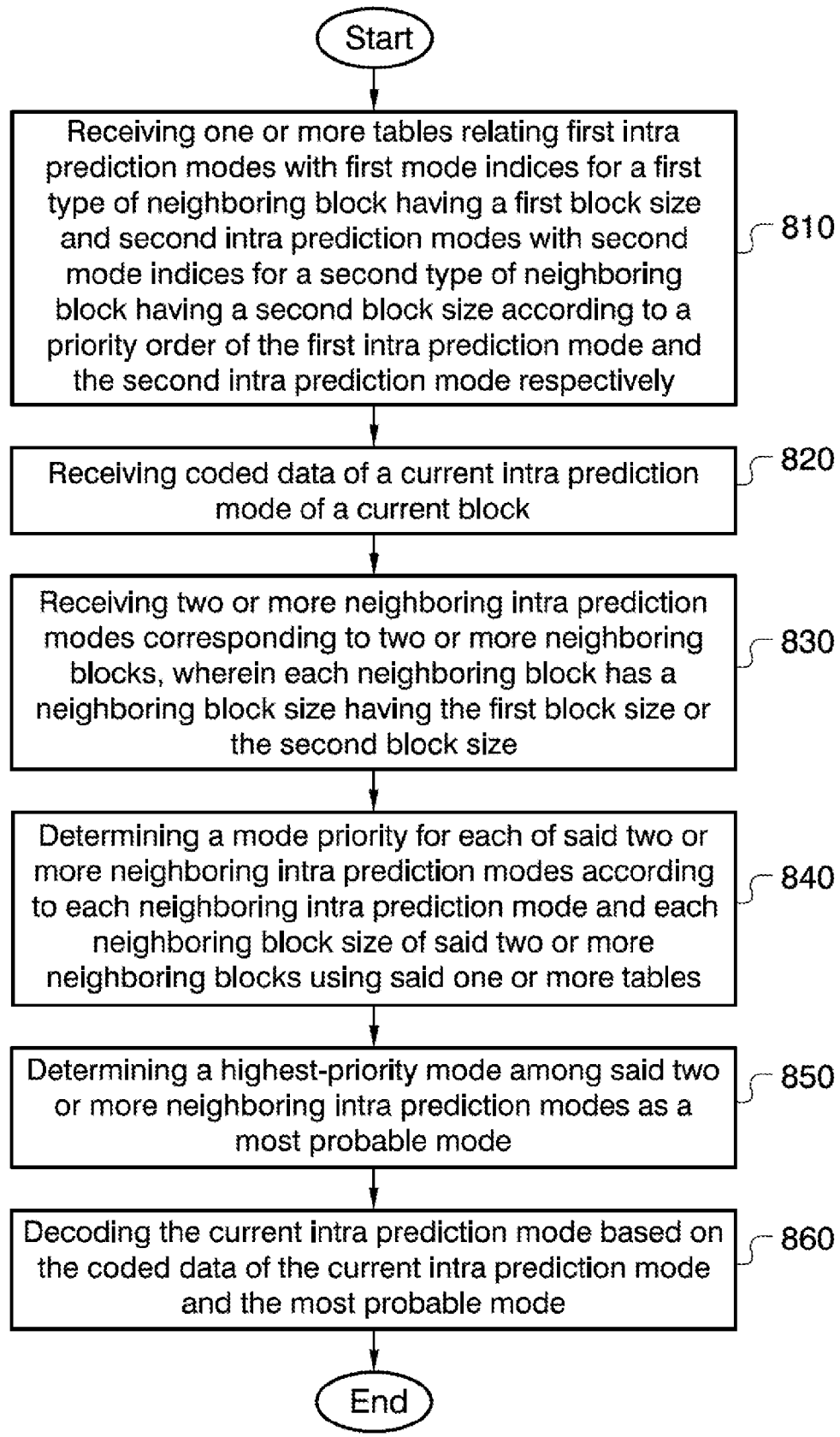
FIG. 8 illustrates an exemplary flow chart for a decoder that incorporates intra prediction with one or more tables to rank intra prediction modes depending on block sizes according to an embodiment of the present invention.

FIG. 8 illustrates an exemplary flow chart for a decoder that incorporates intra prediction with one or more tables to rank intra prediction modes depending on block sizes according to an embodiment of the present invention. One or more tables are received in step 810, where the tables rank first intra prediction modes according to a first priority order for the block having a first block size and ranks second intra prediction modes according to a second priority order for the block having a second block size. Coded data of a current intra prediction mode of a current block as shown in step 820. The coded data may be retrieved from memory (e.g., computer memory, buffer (RAM or DRAM) or other media) or from a processor. Two or more neighboring intra prediction modes corresponding to two or more neighboring blocks are received in step 830, where each neighboring block has a neighboring block size corresponding to the first block size or the second block size. A mode priority for each of said two or more neighboring intra prediction modes is determined according to each neighboring intra prediction mode and each neighboring block size of said two or more neighboring blocks using said one or more tables as shown in step 840. A highest-priority mode is determined among said two or more neighboring intra prediction modes as a most probable mode in step 850. The current intra prediction mode is decoded based on the coded data of the current intra prediction mode and the most probable mode as shown in step 860.

Embodiment of video systems incorporating encoding or decoding of intra luma prediction mode according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of video coding using intra prediction for a block of video data, the method comprising:
   determining one or more tables ranking first intra prediction modes according to a first priority order for a first neighboring block having a first block size and second intra prediction modes according to a second priority order for a second neighboring block having a second block size, wherein the first block size is different from the second block size, and wherein the first priority order is different from the second priority order;

receiving a current intra prediction mode corresponding to a current block;

receiving two or more neighboring intra prediction modes corresponding to two or more neighboring blocks, wherein one of said two or more neighboring block has a neighboring block size corresponding to the first block size and the other one of said two or more neighboring block has a neighboring block size corresponding to the second block size;

determining a mode priority for each of said two or more neighboring intra prediction modes according to each neighboring intra prediction mode and each neighboring block size of said two or more neighboring blocks using said one or more tables;

determining a highest-priority mode among said two or more neighboring intra prediction modes as a most probable mode by identifying a neighboring intra prediction mode with a lowest index relative to all of the two or more neighboring intra prediction modes ranked in their respective tables corresponding to different block sizes; and encoding the current mode using the most probable mode as a predictor.

2. The method of claim 1, wherein said two or more neighboring blocks correspond to an above block located above the current block and a left block located at a left side of the current block.

3. The method of claim 1, wherein the first block corresponds to a 4×4 or 8×8 block.

4. The method of claim 3, wherein Vertical intra prediction mode has a highest priority in said one or more tables, wherein the Vertical intra prediction mode predicts the block in a vertical direction using neighboring reconstructed samples.

5. The method of claim 4, wherein the Vertical intra prediction mode is assigned mode index 0.

6. The method of claim 1, wherein the second block corresponds to a 16×16, 32×32 or 64×64 block.

7. The method of claim 6, wherein DC intra prediction mode has a highest priority in said one or more tables, wherein the DC intra prediction mode predicts the block using a constant value.

8. The method of claim 7, wherein the DC intra prediction mode is assigned mode index 2.

9. The method of claim 6, wherein Planar intra prediction mode has different priorities for different block sizes.

10. The method of claim 1, wherein the block of video data corresponds to a prediction unit (PU).

11. A method of video decoding using intra prediction for a block of video data, the method comprising:

receiving one or more tables ranking first intra prediction modes according to a first priority order for a first neighboring block having a first block size and second intra prediction modes according to a second priority order for a second neighboring block having a second block size, wherein the first block size is different from the second block size, and wherein the first priority order is different from the second priority order;

receiving coded data of a current intra prediction mode of a current block;

receiving two or more neighboring intra prediction modes corresponding to two or more neighboring blocks, wherein one of said two or more neighboring block has a neighboring block size corresponding to the first block size and the other one of said two or more neighboring block has a neighboring block size corresponding to the second block size;

determining a mode priority for each of said two or more neighboring intra prediction modes according to each neighboring intra prediction mode and each neighboring block size of said two or more neighboring blocks using said one or more tables;

determining a highest-priority mode among said two or more neighboring intra prediction modes as a most probable mode by identifying a neighboring intra prediction mode with a lowest index relative to all of the two or more neighboring intra prediction modes ranked in their respective tables corresponding to different block sizes; and decoding the current intra prediction mode based on the coded data of the current intra prediction mode and the most probable mode.

12. The method of claim 11, wherein said two or more neighboring blocks correspond to an above block located above the current block and a left block located at a left side of the current block.

13. The method of claim 11, wherein the first block corresponds to a 4×4 or 8×8 block.

14. The method of claim 13, wherein Vertical intra prediction mode has a highest priority in said one or more tables, wherein the Vertical intra prediction mode predicts the block in a vertical direction using neighboring reconstructed samples.

15. The method of claim 14, wherein the Vertical intra prediction mode is assigned mode index 0.

16. The method of claim 11, wherein the second block corresponds to a 16×16, 32×32 or 64×64 block.

17. The method of claim 16, wherein DC intra prediction mode has a highest priority in said one or more tables, wherein the DC intra prediction mode predicts the block using a constant value.

18. The method of claim 17, wherein the DC intra prediction mode is assigned mode index 2.

19. The method of claim 16, wherein Planar intra prediction mode has different priorities for different block sizes.

20. The method of claim 11, wherein the block of video data corresponds to a prediction unit (PU).

\* \* \* \* \*